3,538,025
PROCESS FOR THE PRODUCTION OF FOAMED REACTIVE LATICES

Douglas Roberts, Norbridge, Bosbury, near Ledbury, Peter Woodward, Redditch, and Glynn Rutter, Droitwich, England, assignors to Uniroyal Limited, Edinburgh, Scotland, a British company
No Drawing. Filed Feb. 20, 1967, Ser. No. 617,033
Claims priority, application England, Feb. 23, 1966, 8,040/66
Int. Cl. C08d *3/02, 13/08;* C08f *15/40*
U.S. Cl. 260—2.5                                    12 Claims

ABSTRACT OF THE DISCLOSURE

Compounds of amphoteric Group II–B or IV–A metals (e.g., zinc oxide, ammonium zirconyl carbonate) are used to cure rubber latex foam in which the rubber is a copolymer containing 0.5–10% of a reactive monomer such as an unsaturated carboxylic acid, e.g., a butadiene-styrene-itaconic acid terpolymer. Starch may be present. The foam, in collapsed or uncollpased form, may serve as a carpet backing.

---

This invention is concerned with foamed synthetic reactive latices and products incorporating such latices in the collapsed and uncollapsed state.

It has previously been proposed to cross-link foamed reactive latices using organic compounds such as melamine-formaldehyde or urea-formaldehyde resins or various organic amines. The term reactive latex is used to describe a synthetic latex of a rubbery copolymer derived from ethylenically unsaturated monomers at least one of which has a further reactive group thereon, which group remains in the copolymer after polymerization.

It is an object of the present invention to provide a stable foam which has a uniform cell structure and which is not readily prone to collapse, using an inorganic metal compound to cross-link the reactive groups, such as carboxyl groups, of the latex. These inorganic cross-linking agents have the advantage, as compared with the above-mentioned organic compounds, that the unfoamed latex composition has better stability and shelf-life and the resulting foam produced is free from the odours of organic compounds such as amines and formaldehyde. The resulting foam also has a good skin and better abrasion resistance as compared with foam prepared in the absence of a cross-linking agent and also as compared with foam prepared using the above mentioned organic compounds as cross-linking agents. The foam also has better compression resistance as compared with conventional foam systems.

According to the present invention therefore there is provided a process for the production of a cross-linked foamed reactive copolymer latex which comprises emulsion polymerizing in an aqueous medium at least two ethylenically unsaturated copolymerisable monomers, said monomers having a minor proportion of units having reactive groups, and incorporating into the latex prior to curing and drying of the foam, a metal compound as an inorganic cross-linking agent for said reactive groups, said metal being one which forms a complex compound of the Werner type and which forms an oxide which is either basic or amphoteric. If the latex is to be stored after the cross-linking agent has been added then the pH should preferably be raised to at least 8.

The latices are preferably prepared from a major proportion of at least two monomers free from reactive groups including styrene, lower alkyl substituted styrenes, lower alkyl acrylates and methacrylates, acrylonitrile, methacrylonitrile, vinyl halides, vinylidene halides, 1,3-butadiene and isoprene. The reactive groups enabling cross-linking are in this case provided by a minor proportion preferably at least about 0.5% by weight of a third monomer. The amount of the third monomer is preferably not more than about 10% by weight and more preferably not more than about 5% by weight of the copolymer.

A wide variety of reactive groups may be incorporated into the latices of the invention such as carboxyl, aldehyde, keto and carbonamido groups and functional equivalents thereof such as esterified carboxyl groups. The preferred reactive group is the carboxyl group which may be incorporated into the latex using a wide variety of ethylenically unsaturated carboxylic acids or esters thereof. It is preferred to use dicarboxylic acids or mono or di esters thereof although mono-, tri-, etc., carboxylic acids may be used. Preferred dicarboxylic acids include itaconic acid, fumaric acid and maleic acid. Monocarboxylic acids which may be used include acrylic acid and methacrylic acid. The corresponding amides of the acids and also substituted amides such as the N-methylolamides may also be used.

The ethylenic unsaturation in all the copolymerisable monomers is normally $\alpha,\beta$-unsaturation. It is preferred to employ at least one vinylaromatic compound such as styrene and at least one conjugated diolefin such as butadiene or isoprene in forming the copolymer latices. Other conjugated diolefins having up to six carbon atoms such as alkyl substituted butadienes may also be employed. The preferred copolymers are thus styrene-butadiene-carboxylic acid; styrene-butadiene-acrylonitrile-carboxylic acid; styrene-acrylonitrile-carboxylic acid and acrylonitrile-butadiene-carboxylic acid copolymers. The degree of resilience of the foam produced will depend on the ratio of these monomers used. To obtain the properties required for example in a foam carpet backing or underlay the copolymer will preferably contain from about 65% to about 80% by weight of butadiene.

The Werner type metal complexes which may be used may operate by decomposing as the pH of the latex is altered or by the application of heat. A preferred class of complexes are based on volatile basic organic or inorganic substances such as ammonia or amines which are removed on heating. The preferred complexes consist of basis salts of di or poly basic acids such as carbonic acid.

The metal atom is preferably an amphoteric metal of Group II–B or IV–A of Mendeleeff's Periodic Table. Metal compounds which may be used include compounds of zinc, cadmium, titanium, zirconium and hafnium. Particularly preferred compounds include zinc compounds including zinc oxide and complex basic zinc salts formed in situ from zinc oxide or preformed prior to addition and complex zirconium salts such as ammonium zirconyl carbonates or bicarbonates having varying ratios of ammonium to zirconyl groups. Other metal compounds which may be used include zinc and cadmium complexes having the formula:

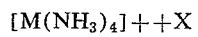

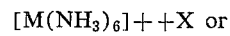

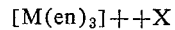

where M represents zinc or cadmium, X represents the water soluble anion and "*en*" represents ethylene diamine. Titanium compounds which may be used include the ammonium titanyl carbonates, similar hafnium compounds may also be used. The use of zinc oxide together with complex zirconium compounds has been found to give a foam having particularly useful physical properties.

The amount of metal compound incorporated into the latex will depend on the degree of cross-linking required and on the degree of resilience required in the foam, it being noted that this is also controlled by the proportion of reactive groups present. The metal atoms present may be equivalent to the reactive groups present or may be present in excess to ensure cross-linking through a high proportion or substantially all the reactive groups present in the copolymer. Generally from about 0.5 to about 5 parts dry weight, by weight of cross-linking agent based on 100 parts of copolymer will be required.

Cross-linking, gelling and drying is preferably accelerated or effected by heat, e.g., a short period of heating under a bank of infra-red heaters, followed by a more prolonged period of heating in an oven to dry the foam. Gelatinisation of starch if present may occur at the same time as curing and gelling of the foam. The steps may be carried out continuously on a moving conveyor belt.

The method of forming the foam and the types and amounts of the various adjuvants, including fillers, added may be regarded as being conventional. Care should be taken regarding whether a particular adjuvant is compatible with the metal compound or compounds employed as cross-linking agents. Adjuvants which will usually be present include surface active agents, catalysts, molecular weight modifiers, antioxidants, foam stabilizers and sensitizers, and fillers. Fillers which may be added include various clays, alumina and various crystalline forms of calcium carbonate.

A particular feature of the invention comprises the addition of a starch, preferably a modified starch to the latex. Modified starches such as etherified, oxidised, dextrinised, carboxylated or esterified starches have the advantage that, when incorporated into the latex, they improve the properties of the resulting foam. Thus for example they reduce cell wall and surface tack and also give increased compression resistance, for instance, increased load bearing properties, to the foam. The dry addition of ungelatinised (boiling) starches also enables more rapid gelation of the foam to be achieved. Where the foam structure is retained in the final material the rapid gelation tends to result in the formation of an even structure and also an improved surface skin with few or no cracks. The amount of starch, where added when the foam structure is to be maintained is preferably from 5 to 50 parts by weight based on 100 parts of copolymer latex solids, more preferably from 5 to 20 parts by weight.

The foam produced by the process of the present invention is susceptible of a wide variety of end uses. One particular end use is in the manufacture of resilient foam backings for carpets. Such backings are typically one half of an inch or less in thickness. In this particular end use it is preferred to use from 1 to 20 parts by weight of starch per 100 parts by weight of dry copolymer.

The foamed reactive latices of the invention may also be used to confer tuft-bind and nonfray properties to carpets, and delamination resistance to non-woven fabrics. Application of the latex in the foamed condition has the advantage that it facilitates applying an even weight of latex to the back of a carpet prior to suction being applied. In this end use the latex is foamed either in a continuous or discontinuous foamer. The foam is then applied preferably to the backing of the carpet as it lies pile down on a moving belt. Excess foam is doctored off by a levelling blade. The foam is then sucked into the carpet as the latter travels over a suction box. It may be noted that the added use of starch in the latex formulation improves the handle of carpets treated in this way.

In general terms the foam of the invention will be bonded or adhering to a substrate. Examples of articles which may usefully incorporate the foam include mattresses, pillows, car seats, paths of foundation garments, insulating partions and interlinings.

The invention will now be illustrated with reference to the following examples in which all parts and percentages are by weight.

The following general recipe illustrates the preparation of a reactive nonfoamed latex. To a stirred autoclave there was added in order:

| | Parts |
|---|---|
| Water | 100 |
| Sodium dodecyl benzene sulphonate | 4 |
| Potassium persulphate | 1.25 |
| Styrene | 28 |
| Itaconic acid | 2 |
| Mixed tertiary mercaptans (TMT) | 0.2 |

The autoclave was purged oxygen free using 1,3-butadiene as an inert gas and then 70 parts of 1,3-butadiene were fed in. Polymerization was then effected with stirring at 55° C. for 18 hours. The reaction was short-stopped at 75–80% conversion to give a stable latex having a solids content of 43%. The latex was vacuum stripped to remove unreacted monomers and concentrated to a minimum solids content of 55%. The pH was then raised to at least 8.3 by the addition of ammonium hydroxide. Various adjuvants were then added as follows based on 100 parts of latex calculated on a dry solids basis:

| | Parts |
|---|---|
| Naugawhite (antioxidant) (alkylated bis phenol) | 2 |
| Lauryl sodium sulphate | 0.5 |
| China clay (filler) | 100 |
| Reversible silicone soap (Silicone DL193) | 1 |

A cross-linking agent (or agents) was then added according to the examples given below.

EXAMPLE 1

3.5 pts. of zinc oxide in an equal weight of water was added to the unfoamed latex prepared according to the recipe given above. The latex was then foamed using a continuous foamer. The foam was spread, gelled, cured and dried. Gelling was effected by heating for 15 seconds under an infrared heater and then the foam was cured and dried in an oven at 270° F. for 20 minutes. The resulting foam had a good structure and on compression gave good recovery.

EXAMPLE 2

5 pts. of an aqueous solution of ammonium zirconyl bicarbonate having the formula $(NH_4)_3HZrO(CO_3)_3$ containing 7.5% by weight of zirconium was used in place of the 3.5 pts. of zinc oxide of Example 1. The resulting dried foam again had a satisfactory structure and good recovery on compression.

EXAMPLE 3

The procedure of Example 2 was followed except that twice the weight of ammonium zirconyl carbonate solution (10 pts.) was employed. The foam structure and recovery were better than that of the foam of Example 2.

EXAMPLE 4

The procedure of Example 2 was followed except that in addition 5 pts. of an ungelatinised etherified starch in 5 pts. of water was also added. The starch was about 10% etherified with hydroxy propyl groups. This addition of starch gave an improved foam structure as compared with Example 2. The foam was softer and the rate of recovery after compression slightly lower than without the starch.

EXAMPLE 5

The procedure of Example 2 was followed except that in addition 0.75 part of sodium alginate as a foam stabilizer (Manucal EX/LL sold by Alginate Industries Limited) dissolved in 24.25 parts of water was also added. The resulting foam had good recovery after compression.

EXAMPLE 6

The procedure of Example 3 was followed except that in addition 0.5 part of Manucal EX/LL in 16.6 parts of water was added. The foam structure was very good as was the recovery after compression.

EXAMPLE 7

The procedure of Example 3 was followed except that in addition 20 parts of ungelatinised etherified (10% hydroxy propyl) starch in 20 parts of water was also added. A very good finished foam was obtained having good structure and good recovery after compression.

EXAMPLE 8

The procedure of Example 7 was followed except that 2 parts of Teepol was also added to improve foaming. The finished foam had a very good structure and recovery. The density of the foam was 270 gms./litre. The pH was 9.1. The viscosity (Brookfield) using a No. 4 spindle was 2700 cps. at 10 r.p.m.; 2100 cps. at 20 r.p.m.; 1592 cps. at 50 r.p.m. and 1246 cps. at 100 r.p.m.

EXAMPLE 9

The procedure of Example 8 was followed except that in addition 2.2 pts. of a solution containing 1 part of Dowfax 2A1 surface active agent was also added. This increased the foam ratio to give a density of 180 gms./litre.

EXAMPLE 10

The procedure of Example 9 was followed except that the Dowfax 2A1 was omitted, the amount of aqueous solution of zirconyl carbonate was reduced to 8 parts and 2 parts of zinc oxide in 2 parts of water were added. The latex thus included 2 parts Teepol, 40 parts starch slurry, 4 parts zinc oxide suspension and 8 parts ammonium zirconyl carbonate solution. The addition of zinc oxide improved the cure and hence the resilience of the resulting foam.

EXAMPLE 11

The procedure of Example 8 was repeated but using only 15 parts of the ungelatinised etherified starch in 15 parts of water. The foam structure was slightly coarser than in Example 8 but the recovery was very good. The density of the foam was 320 gms./litre and the pH 9.2.

Viscosity (Brookfield), spindle 4: at 10 r.p.m., 5300 cps.; at 20 r.p.m., 4070 cps.; at 50 r.p.m., 2776 cps.

EXAMPLE 12

The procedure of Example 8 was repeated but using only 10 parts of ungelatinised etherified starch in 10 parts of water. The foam structure was quite good and the recovery after compression very good. The density of the foam was 350 gms./litre and pH 9.2.

Viscosity (Brookfield), spindle 4: at 10 r.p.m., 4800 cps.; at 20 r.p.m., 3650 cps.; at 50 r.p.m., 2650 cps.

EXAMPLE 13

The procedure of Example 8 was repeated but using only 5 parts of ungelatinised etherified starch in 5 parts of water. The foam structure was not so good as in Example 12 but the recovery was very good. The foam density was 310 gms./litre and the pH 9.2.

Viscosity (Brookfield), spindle 4: at 10 r.p.m., 9200 cps.; at 20 r.p.m., 6700 cps.

Having thus described our invention, what we claim and desire to protect by Letters Patent is:

1. A process for the production of cross-linked foamed reactive copolymer latex which comprises providing an acidic latex of a rubbery copolymer containing 65–80% by weight of butadiene units, 0.5–10% by weight of copolymerizable monoethylenically unsaturated reactive monomer units in which the reactive group consists of carboxyl, the remainder of the copolymer being made up of units of copolymerizable monoethylenically unsaturated monomer devoid of reactive groups, incorporating into the said latex, as the sole cross-linking agent for said reactive groups, a mixture of a major proportion of a complex zirconium salt with a minor proportion of zinc oxide, in amount of from 0.5 to 5 parts per 100 parts by weight of the copolymer, foaming the latex, and curing and drying the foam at elevated temperature.

2. A process as claimed in claim 1 wherein from 5 to 50% by weight of starch is added to the latex based on the weight of the copolymer.

3. A process as claimed in claim 1 wherein the starch is a hot water soluble starch.

4. A process as claimed in claim 3 wherein the starch is an etherified starch.

5. A process as claimed in claim 1 wherein the starch added is an ungelatinised starch.

6. A cross-linked reactive copolymer latex foam prepared by a process as claimed in claim 1.

7. A composite article comprising a substrate and adhering to said substrate a foam as claimed in claim 6.

8. A process as claimed in claim 1 wherein itaconic acid, fumaric acid, maleic acid, acrylic acid or methacrylic acid is used as the said monomer containing reactive groups.

9. A carpet having applied to its back, prior to curing and drying, the foamed latex defined in claim 6.

10. A carpet as in claim 9 in which the foam is collapsed on the back of the carpet.

11. A process as in claim 1 in which the zirconium complex is ammonium zirconyl carbonate.

12. A process as in claim 1 in which the copolymer rubber is a terpolymer of butadiene, styrene and itaconic acid.

References Cited

UNITED STATES PATENTS

| 2,444,869 | 7/1948 | Clayton et al. | 260—2.56 |
|---|---|---|---|
| 2,472,055 | 5/1949 | McFadden et al. | 260—2.56 |
| 2,711,977 | 6/1955 | Butsch | 260—2.56 |
| 2,945,826 | 7/1960 | Everett | 260—2.56 |
| 3,083,124 | 3/1963 | Rahmes | 260—2.56 |
| 3,215,645 | 11/1965 | Dunn | 260—2.56 |

MURRAY TILLMAN, Primary Examiner

M. FOELAK, Assistant Examiner

U.S. Cl. X.R.

260—17, 29.4, 66, 73, 78.5, 80.7, 80.8, 82.1, 96, 851, 852, 853, 855, 856